US009556987B2

United States Patent
OBryan

(10) Patent No.: US 9,556,987 B2
(45) Date of Patent: Jan. 31, 2017

(54) DIRECT CONNECT ADAPTER DEVICE

(71) Applicant: Ernest Allan OBryan, Rising Sun, MD (US)

(72) Inventor: Ernest Allan OBryan, Rising Sun, MD (US)

( * ) Notice: Subject to any disclaimer, the term of this patent is extended or adjusted under 35 U.S.C. 154(b) by 136 days.

(21) Appl. No.: 13/950,270

(22) Filed: Jul. 24, 2013

(65) Prior Publication Data

US 2014/0053934 A1 Feb. 27, 2014

Related U.S. Application Data

(60) Provisional application No. 61/741,598, filed on Jul. 25, 2012.

(51) Int. Cl.
| | |
|---|---|
| *A47L 5/00* | (2006.01) |
| *A47L 9/00* | (2006.01) |
| *B08B 5/00* | (2006.01) |
| *D06G 1/00* | (2006.01) |
| *A47L 5/38* | (2006.01) |
| *A47L 15/00* | (2006.01) |

(Continued)

(52) U.S. Cl.
CPC ............... *F16L 29/00* (2013.01); *A47L 5/36* (2013.01); *A47L 5/38* (2013.01); *A47L 7/0014* (2013.01); *A47L 9/242* (2013.01); *A47L 9/244* (2013.01); *A47L 9/246* (2013.01); *Y10T 137/9029* (2015.04)

(58) Field of Classification Search
CPC ............ A47L 5/38; A47L 9/242; A47L 9/246; A47L 7/0014; A47L 9/244
USPC ..... 251/149.1–149.9, 144–156; 15/301, 313, 15/314, 315, 321, 322, 323
See application file for complete search history.

(56) References Cited

U.S. PATENT DOCUMENTS 3,029,463 A * 4/1962 Bishop ........................ 15/353
3,911,944 A * 10/1975 Hukuba .............. A47L 9/0009
137/355.2

(Continued)

FOREIGN PATENT DOCUMENTS

DE 3717569 C1 * 7/1988 ............. B08B 15/02

*Primary Examiner* — Mary McManmon
*Assistant Examiner* — Hailey K Do
(74) *Attorney, Agent, or Firm* — Garrett James O'Sullivan; Eric Brandon Lovell

(57) ABSTRACT

An adapter box which makes possible a direct connect 110 volt central vacuum system hose to be plugged into a portable vacuum cleaner in the same way that a 110 volt direct connect central vacuum system hose would plug into an in home central vacuum system using direct connect central vacuum system inlets.

An adapter box that attaches to the inlet vacuum port of a portable vacuum cleaner (household, commercial, or other) for the purpose of making compatible and possible the plugging in of a direct connect central vacuum system hose in the same way the same hose would be plugged into the direct connect central vacuum system inlet valve of an in house central vacuum system. This type hose allows 110 volts to be available for the operation of a 110 volt powered rug cleaning attachment.

An adapter box that allows a direct connect central vacuum system hose to function with a portable vacuum cleaner so that it may function in like fashion to a central vacuum system in a home where the hose simply plugs into a direct connect central vacuum system wall inlet receiving vacuum power from the central vacuum system power unit through pipes installed in the walls and ceilings of the building.

7 Claims, 3 Drawing Sheets

(SIDE VIEW OF EXAMPLE OF FULLY ASSEMBLED DIRECT CONNECT ADAPTER BOX)
(The word "Box" replaces the word device)

(51) Int. Cl.
*F16L 29/00* (2006.01)
*A47L 9/24* (2006.01)
*A47L 7/00* (2006.01)
*A47L 5/36* (2006.01)

(56) References Cited

U.S. PATENT DOCUMENTS

| | | | | |
|---|---|---|---|---|
| 4,758,170 | A * | 7/1988 | Hayden | A47L 5/38 |
| | | | | 439/142 |
| 4,997,209 | A * | 3/1991 | McGrath et al. | 285/7 |
| 5,054,157 | A * | 10/1991 | Werner | A47L 5/32 |
| | | | | 15/328 |
| 5,191,673 | A * | 3/1993 | Damizet | A47L 5/38 |
| | | | | 15/314 |
| 5,210,902 | A * | 5/1993 | Lee | A47L 7/0009 |
| | | | | 15/321 |
| 6,516,492 | B1 * | 2/2003 | Kang | A47L 5/38 |
| | | | | 15/314 |
| 2002/0069477 | A1 * | 6/2002 | Smith et al. | 15/377 |
| 2005/0183228 | A1 * | 8/2005 | Snyder | 15/314 |
| 2005/0183231 | A1 * | 8/2005 | Mein | A47L 7/0076 |
| | | | | 15/321 |
| 2007/0017057 | A1 * | 1/2007 | Zimmerle | A47L 5/38 |
| | | | | 15/315 |
| 2007/0186370 | A1 * | 8/2007 | Oh | A47L 5/225 |
| | | | | 15/321 |
| 2011/0100485 | A1 * | 5/2011 | Mantyla | A47L 5/38 |
| | | | | 137/360 |
| 2011/0283475 | A1 * | 11/2011 | Cappuccio | A47L 7/0042 |
| | | | | 15/327.1 |

* cited by examiner

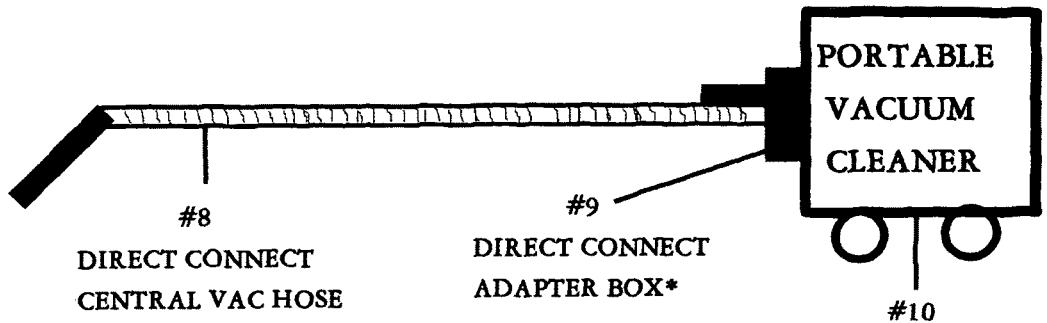

8
DIRECT CONNECT
CENTRAL VAC HOSE

9
DIRECT CONNECT
ADAPTER BOX*

10

(This diagragm shows the concept of connecting a direct connect central vacuum system hose to a portable vacuum cleaner by means of a direct connect adapter box*.)

FIG. 1a

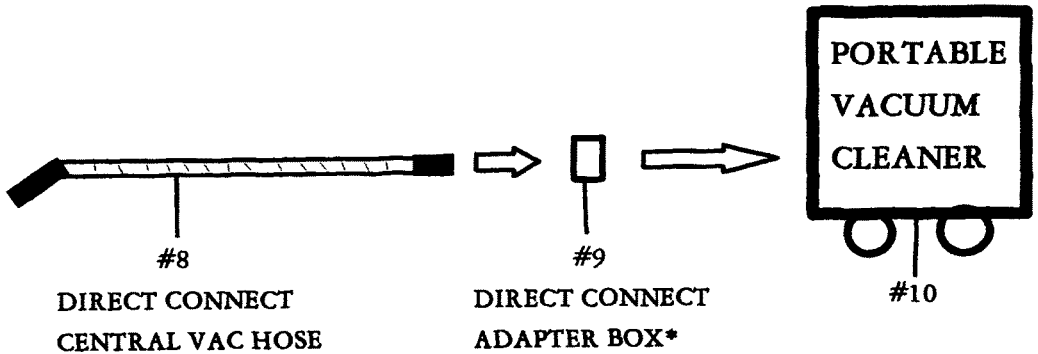

8
DIRECT CONNECT
CENTRAL VAC HOSE

9
DIRECT CONNECT
ADAPTER BOX*

10

(This diagram shows the progression of attachment from hose to adapter to portable vacuum cleaner.)

FIG. 1b

* (Wherever the word box on this page is used it replaces the word device which was previously used.)

( SIDE VIEW OF EXAMPLE OF FULLY ASSEMBLED
DIRECT CONNECT ADAPTER BOX)

( The word "Box" replaces the word device)

(PARTS FOR AN EXAMPLE OF A DIRECT CONNECT ADAPTER BOX)

(The word "Box" replaces the word device>)

US 9,556,987 B2

DIRECT CONNECT ADAPTER DEVICE

BACKGROUND OF THE INVENTION

This invention relates generally to a need to make the job of cleaning an auditorium or classroom easier. Vacuum cleaning down long narrow isles and around chair and table legs in an auditorium or class room has proven to take a lot of time and effort when using standard portable vacuum cleaners. Experience has shown that time and effort can be saved when vacuuming with just a hose and attachment as is the case when a central vacuum system is used. Some buildings especially those with the floor consisting of a poured cement slab make installing a central vacuum system not possible or cost prohibitive. The invention of a direct connect adapter box makes it possible to attach a central vacuum system direct connect hose to a portable vacuum cleaner in the same way that it would plug into a wall inlet of a central vacuum system. This makes it possible to clean an auditorium or classroom with the same ease of cleaning which is acquired with the usage a central vacuum cleaner. Portable vacuum sources using long hoses have been around a long time. The uniqueness of this invention is the obtained ability to plug a direct connect hose (readily available on the market) into a portable vacuum cleaner and then to proceed with the same ease and time saving attributes which one has when vacuuming with a central vacuum system.

SUMMARY OF THE INVENTION

The present invention is an adapter which makes possible a direct connect central vacuum system hose (readily available for purchase on the open market) to attach to a portable vacuum cleaner in the same way this same hose would plug into a direct connect wall inlet which is part of a central vacuum system.

A new device which makes possible a commonly called direct connect central vacuum system hose which may be readily purchasable in the marketplace to be used without any modification of said hose with a standard vacuum cleaner by means of an adapter I call a Direct Connect Adapter Device.

This Direct Connect Adapter Device is assembled in such a way that one side attaches to the inlet port of a standard vacuum cleaner without any alteration of the inlet port of the vacuum cleaner. The opposite side of the Direct Connect Adapter Device uses a commonly called direct connect electric inlet valve which may be readily purchased in the marketplace. This inlet valve without alteration attaches to the above said direct connect central vacuum system hose in the same way that it would plug into the same inlet valve if said inlet valve were installed naturally in the wall of a house as part of a commonly called central vacuum system.

The uniqueness of this Direct Connect Adapter Device is that it makes possible to vacuum with an electrified power rug attachment a carpet or any such thing using a standard Vacuum cleaner. This makes vacuuming around obstacles like chair and desk legs and aisles a lot easier. It functions like a central Vacuum system only its portable. The direct connect adapter device makes possible a new type of portable vacuum system using a standard vacuum cleaner.

Therefore, a general object would be to be able to vacuum in a spatial area with the same ease that would be accomplished when vacuuming with a central vacuum system. This is because a vacuum tool attached to a wand which is attached to a hose is lighter in weight, smaller in size, and more maneuverable around objects in tight spaces. A standard portable vacuum cleaner always seems to be getting in the way in confined spaces because it is either being pushed, carried, or dragged behind the user resulting in more effort being exerted to accomplish the task. Equipment that is less in weight and smaller in size takes less effort to accomplish a cleaning task. Unfortunately equipment smaller in size and weight has less cleaning power and the result is that more effort has to be exerted to accomplish the task. This may be ok if a person has a very small space to clean but where large areas are needed to be vacuumed the ideal is equipment that has less weight, is smaller in size, and has the most vacuum suction power. With a direct connect central vacuum system hose plugged into this adapter which is attached to a powerful portable vacuum cleaner a person is enabled to clean faster with less effort without sacrificing suction power.

BRIEF DESCRIPTION OF THE DRAWINGS

FIG. 1a is a perspective view of a direct connect central vacuum system hose plugged into a Direct Connect Adapter Box and attached to a portable vacuum cleaner.

FIG. 1b is a perspective view of a direct connect central vacuum system hose separated from a Direct Connect Adapter Box which is separated from a portable vacuum cleaner.

DESCRIPTION OF THE PREFERRED EMBODIMENT

1). The Enclosure Housing (FIG. 1)

The enclosure housing (#1) is the part of the adapter box upon which all the components (#'s 2,3,4,5) of the adapter box are attached. It (#1) may be made of metal, plastic, or any other material that works. It (#1) may be any shape. It may be any size. Preferably a six sided rectangular box shape may be used that is around the size of a central vacuum system direct connect inlet valve. One side of the rectangular shaped box with six sides may be open where a central vacuum system direct connect inlet valve may attach using screws similar to those supplied with the inlet valve. This side would be completely open compared to the other sides which may be made of metal or some other material. A means by which the screws of the inlet valve attach to the enclosure housing needs to be made. Preferably two one half inch plates of metal or some other material with a thickness of around an eighth of an inch may be attached to the enclosure housing, one plate to the top and the other plate to the bottom of and parallel to the open side of the enclosure housing. This would be so that the central vacuum system inlet valve would have a way to attach securely to the enclosure housing. In each of these plates one hole would be drilled that corresponds and lines up with the holes of the direct connect inlet valve so that the screws of the inlet valve would fasten to the above and below plates in the same manner that an inlet valve would fasten to a mounting plate of a central vacuum system. This would allow the direct connect inlet valve to securely be attached to the above mentioned enclosure housing. The direct connect inlet valve used can be any central vacuum system inlet valve which accepts a direct connect type central vacuum system hose currently or not currently on the market.

Figure 2:
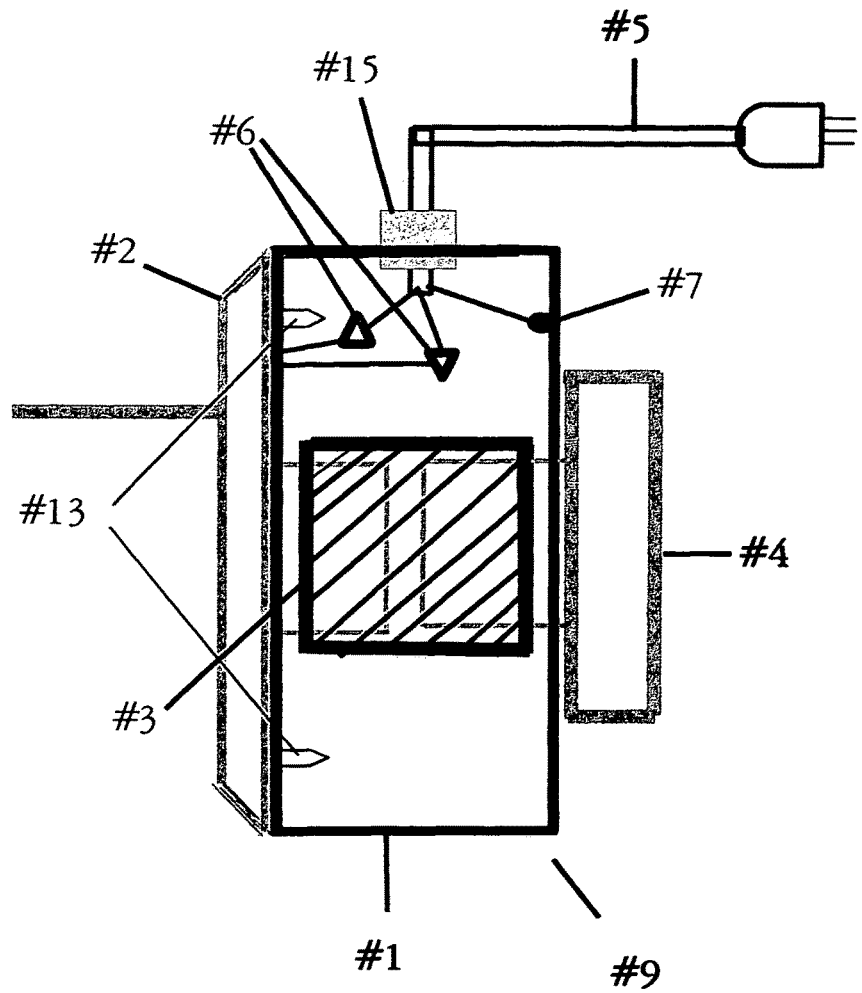
FIG. 2 is an enlarged perspective view of an embodiment of a finished Direct Connect Adapter Box as in FIG. 1a and FIG. 1b. as looking from the side into the enclosure housing.

2). Direct Connect Central Vacuum System Inlet Valve (FIG. 2)

A direct connect central vacuum system inlet valve (FIG. 2) which uses a direct connect central vacuum system hose. This valve would attach to the above enclosure housing through screws or other means usually supplied with the valve when purchased. This type inlet valve may be one currently on the market or one of similar type made in the future.

Figure 3:
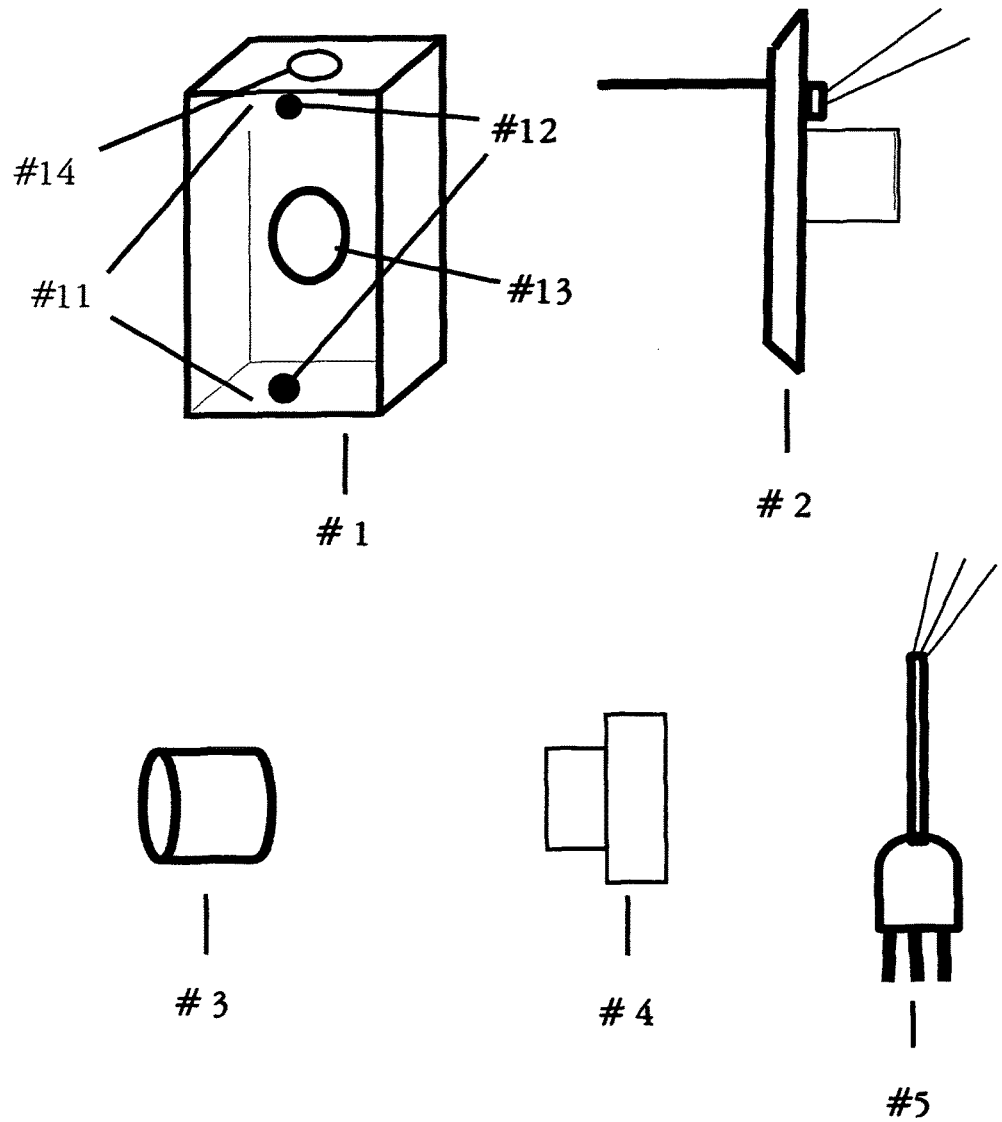
FIG. 3 is a perspective view of parts that could make up an embodiment of a Direct Connect Adapter Box

3). Connection Fixture (FIG. 3)

Connected to the back side of the inlet valve (FIG. 2) is a connection fixture (FIG. 3) which purposes to connect the inlet valve to the attachment fixture (FIG. 4) which attaches to the vacuum cleaner being used as the vacuum power source. From the inlet valve (#2) air and dirt particulate flow through this connection fixture (#3) into the attachment fixture (#4) that attaches to the vacuum cleaner and deposits into the vacuum cleaner itself. This connection fixture (#3) connects and seals without leaking the inlet valve to the portable vacuum cleaner attachment fixture (#4) which connects to a vacuum cleaner.

This connection fixture (#3) may be made of plastic, metal or some other material. In some cases the connection fixture (#3) may function as a reducer under the circumstances that the inlet valve stem and the vacuum cleaner attachment fixture (#4) stem may not be the same size. This connection fixture (#3) may be round but may be any shape that makes the adapter box work. This connection fixture (#3) may slip over the stem of the inlet valve and may slip over the stem of the attachment fixture (#4) that attaches to the vacuum cleaner being used.

4). Attachment Fixture (FIG. 4)

The attachment fixture (FIG. 4) is the means by which the adapter box attaches to a vacuum cleaner. The attachment fixture (#4) may comprise of a part of a vacuum cleaner hose that is similar to the commonly known part of a vacuum cleaner hose called the machine end. The function of the hose machine end is to attach a vacuum cleaner hose to a vacuum cleaner. It is a similar portion of this part that is used to attach the adapter box to the vacuum cleaner. Different vacuum cleaners use different hose machine ends and therefore a similar corresponding hose machine end of a particular vacuum cleaner could be used as part of the adapter box to allow the adapter box to attach to a vacuum cleaner. The adapter box by means of the attachment fixture (#4) would replace the hose supplied with a vacuum cleaner allowing the vacuum cleaner to use a direct connect central vacuum cleaner hose. An opening may be made in the enclosure housing through which the attachment fixture enters into it (#1). Preferably this opening may be on the side of the enclosure housing opposite the inlet valve (#2) side. This opening may be any shape but preferably a shape whether round, square, etc. that would conform to the shape of the attachment fixture. The means of attaching this adapter box to the vacuum cleaner may be by screwing on, pushing in, plugging in or any other means similar to the way in which the hose supplied with the vacuum cleaner would attach.

5). The Power Cord (FIG. 5)

A 110 volt power cord (FIG. 5) with a plug that would plug into the exterior 110 volt power source receptacle of the vacuum cleaner being used may be wired into the adapter box. This cord needs to be long enough to reach between the vacuum cleaner and the adapter box so that it is not so short that it would pull against where it is attached to the adapter box or so short that it would pull against the receptacle into which it is plugged.

A strain relief may be a means by which the cord (#5) is securely attached to the adapter box while entering into the adapter box. A hole may be drilled into one side of the adapter box which may correspond to the type of the strain relief being used so that the cord may enter into the adapter box. This cord may enter into the enclosure housing any where that space may allow however it is preferable through the top side of the enclosure housing. One end of the cord plugs into the vacuum cleaner receptacle and the other end is connected internally in the enclosure housing to the wire leads of the direct connect inlet valve. The connection of the wires may be with wire nuts, plastic crimp connectors, or any acceptable means.

What is claimed is:

1. A portable central vacuum system comprising:
    a. an electrically-powered portable vacuum cleaner comprising:
        1. an electrical power source receptacle; and
        2. a hose inlet port;
    b. an electrically-powered central vacuum system hose; and
    c. a direct connect adapter comprising:
        1. a housing;
        2. an inlet valve comprising wire leads, said inlet valve extending into the housing for receiving a proximal end of the central vacuum system hose, said central vacuum system hose being in electrical communication with the wire leads;
        3. an electrical power cord, a first end of the electrical power cord being electrically connected to the inlet valve's wire leads, and a second end of the electrical power cord comprising a plug that plugs into the electrically-powered portable vacuum cleaner's power receptacle;
        4. an attachment fixture having a first end extending into the housing and a second end that releasably engages the electrically-powered portable vacuum cleaner's hose inlet port; and
        5. a connection fixture inside the housing, wherein a first end of the connection fixture sealingly engages the inlet valve and a second end of the connection fixture sealingly engages the attachment fixture's first end, wherein particulate being vacuumed into the electrically-powered central vacuum system hose passes, in succession, through the inlet valve, the connection fixture, the attachment fixture, and into the electrically-powered portable vacuum cleaner.

2. The portable central vacuum system of claim 1, wherein the inlet valve and the attachment fixture are axially aligned.

3. The portable central vacuum system of claim 1, wherein the second end of the attachment fixture comprises a vacuum cleaner hose machine end that connects to the electrically-powered portable vacuum cleaner.

4. The portable central vacuum system of claim 1, wherein the connection fixture is made of a material selected from a group consisting of metal and plastic.

5. The portable central vacuum system of claim 1, wherein the electrically-powered vacuum cleaner, the electrical power source receptacle, the power cord, and the electrically-powered central vacuum system hose are configured to receive 110 volts of electricity, wherein the electrically-powered portable vacuum cleaner electrically connects to a 110 volt power source to power the portable central vacuum system.

6. The portable central vacuum system of claim 5, further comprising a 110 volt powered rug cleaning attachment that mechanically and electrically engages a distal end of the electrically-powered central vacuum system hose.

7. The portable central vacuum system of claim 1, wherein the electrically-powered portable vacuum cleaner further comprises wheels.

\* \* \* \* \*